United States Patent
Mäkinen

(10) Patent No.: US 8,510,070 B2
(45) Date of Patent: Aug. 13, 2013

(54) NON-CONTACTING TEMPERATURE PROFILE MEASUREMENT OF ROTATING ROLLS

(75) Inventor: Tuomo Tapio Mäkinen, Nokia (FI)

(73) Assignee: Honeywell International Inc., Morristown, NJ (US)

( * ) Notice: Subject to any disclaimer, the term of this patent is extended or adjusted under 35 U.S.C. 154(b) by 398 days.

(21) Appl. No.: 12/791,634

(22) Filed: Jun. 1, 2010

(65) Prior Publication Data

US 2011/0295540 A1    Dec. 1, 2011

(51) Int. Cl.
*G01K 15/00* (2006.01)
(52) U.S. Cl.
USPC .............. 702/99; 702/130; 702/155
(58) Field of Classification Search
None
See application file for complete search history.

(56) References Cited

U.S. PATENT DOCUMENTS

| | | | |
|---|---|---|---|
| 3,542,123 A * | 11/1970 | Hornbaker et al. | 165/277 |
| 3,762,211 A * | 10/1973 | Poulsen | 73/38 |
| 4,704,776 A * | 11/1987 | Watanabe et al. | 492/54 |
| 4,709,488 A | 12/1987 | Anselmino | |
| 4,867,574 A | 9/1989 | Jenkofsky | |
| 4,877,331 A | 10/1989 | Schrors | |
| 5,562,027 A * | 10/1996 | Moore | 100/35 |
| 6,341,522 B1 | 1/2002 | Goss et | |
| 6,827,485 B2 | 12/2004 | Isebrand | |

* cited by examiner

*Primary Examiner* — Jonathan C Teixeira Moffat
*Assistant Examiner* — Mischita Henson
(74) *Attorney, Agent, or Firm* — Cascio Schmoyer & Zervas

(57) ABSTRACT

A high-resolution, non-contact sensor that measures the temperature of an elongated roll comprises an array of low-mass air temperature elements positioned adjacent the cylindrical surface. As the roll rotates a boundary layer of air is formed along the contour of the roll. Each air temperature element can be housed in a chamber into which a portion of the boundary layer air directed. The temperature of the air temperature element eventually stabilizes and is a function of the roll surface temperature. Associated air compensator elements detect ambient air temperatures and the actual surface temperature profile is extracted from calibration curves based on measurements from both the air temperature and compensator elements.

23 Claims, 4 Drawing Sheets

NON-CONTACTING TEMPERATURE PROFILE MEASUREMENT OF ROTATING ROLLS

FIELD OF THE INVENTION

The present invention generally relates to non-contact techniques for measuring the surface temperature profile along the length of an elongated rotating roll in harsh environments such as in papermaking facilities.

BACKGROUND OF THE INVENTION

In the manufacture of paper on continuous papermaking machines, a web of paper is formed from an aqueous suspension of fibers (stock) on a traveling mesh papermaking fabric as water drains by gravity and suction through the fabric. The web is then transferred to the pressing section where more water is removed by pressure and vacuum. The web next enters the dryer section where steam heated dryers and hot air completes the drying process. The papermaking machine is, in essence, a water removal, system.

Temperature controlled rotating rolls are used throughout the papermaking process. For instance, a web or sheet of paper from the forming section and press section of papermaking machine is conveyed through a series of drying cylinders where additional water is removed and the web or sheet structure consolidated. In the finishing section, the paper typically contacts a series of water or oil-heated rolls where improved surface characteristics are imparted on the paper sheet. In some machines, the sheet is calendered through a series of rolls to allow for thickness control and to further smooth the surface. A heating device is typically used to selectively heat a calender roll surface to control the sheet caliper in the cross direction.

Maintaining the temperature profiles of the various rotating rolls, which including cylinders, at the desired temperature ranges is critical for process optimization and attendant product quality control. Most of the rolls have polished mild steel finishes, which can be covered with chrome, so the surfaces are very shiny and reflective of light. Infrared sensors, for example, have been employed to continuously measure the temperature profiles of these reflective surfaces. Unfortunately, implementing optical pyrometry techniques have proved to be a challenge in part because of variations in reflectivity of the rotating surfaces and/or low emissivity of the surface materials. As a result, IR devices are very expensive and complicated. Using contacting temperature probes based on thermovoltaic or thermoresistive principles is not a viable option since the probes will erode the smooth rotating surface with the concomitant buildup of debris.

SUMMARY OF THE INVENTION

The present invention is based in part on the recognition that a high-resolution, non-contacting sensor can be employed to continuously measure the temperature profile along the length of a rotating elongated roll. The sensor preferably comprises an array of low thermal mass air temperature elements that is positioned adjacent the cylindrical surface of a rotating roll. As the roll rotates a boundary layer of air is formed along the contour of the roll. Each sensor element can be housed in a chamber into which a portion of the boundary layer air directed. The temperature of the sensor element eventually stabilizes and is a function of the roll surface temperature. A compensator sensor measures ambient air temperature. The actual surface temperature is extracted from calibration curves based on both the air temperature element and compensator sensor readings. The non-contacting sensor has a reference sensor, which is typically positioned at the edge of the rotating elongated roll. It includes a reference air temperature element, a reference compensator sensor, and a standardization sensor that periodically measures the temperature of the roll surface. Prior to operation of the non-contacting sensor, an initial calibration of the reference air temperature element, reference compensator sensor, and standardization sensor is performed during startup of the rotating rolls with a contact probe calibration sensor. Each sensor along the roll is also calibrated during startup of the rotating rolls with a contact probe calibration sensor, producing individual calibration curves as well as a correction curve based on the difference of response between the edge contact sensor and the sensors along the roll. The non-contacting sensor is particularly suited for use in harsh environments such as in a papermaking facility.

In one aspect, the invention is directed to a device for measuring the temperature of a surface of a rotating roll that is rotatable about a longitudinal axis that includes:

an air temperature sensor which is configured to be positioned adjacent the surface of the rotating roll such that a gap is established between the air temperature sensor and the surface of the rotating roll, wherein rotation of the rotating roll causes air to flow through the gap and onto the air temperature sensor, and wherein the air temperature sensor generates first signals that are indicative of the temperature of the air that comes into contact with the air temperature sensor;

a compensator temperature sensor that generates second signals that are indicative of ambient temperature;

a standardizing sensor that generates third signals that are indicative of the surface temperature of the roll; and means for calculating the temperature of the surface of the rotating roll based on the first signals, second signals, and third signals.

In another aspect, the invention is directed to an apparatus for detecting the surface temperature profile of an elongated rotating roll that is rotatable about a longitudinal axis that includes:

(a) a reference sensor configured to be positioned adjacent a first location along the length of the roll which includes:

(i) a reference air temperature sensor configured such that a gap is established between the reference air temperature sensor and the surface of the rotating roll, wherein rotation of the rotating roll causes air to flow through the gap and onto the reference air temperature sensor, and wherein the reference air temperature sensor generates first signals that are indicative of the temperature of the air that comes into contact with the reference air temperature sensor;

(ii) a reference compensator temperature sensor that generates second signals that are indicative of ambient temperature; and (iii) a standardizing sensor that generates third signals that are indicative of the surface temperature of the roll;

(b) a plurality of profile sensors which are each configured to be positioned at a location along the length of the roll with each profile sensor including:

(i) a profile air temperature sensor configured such that a gap is established between each profile air temperature sensor and the surface of the rotatable roll, wherein rotation of the rotatable roll causes air to flow through each gap and onto the profile air temperature sensor, and wherein each profile air temperature sensor generates first signals that are indicative of the air flow that comes into contact with the profile air temperature sensor; and (ii) a profile compensator sensor that generates second signals that are indicative of ambient temperature; and (c) means for calculating the surface temperature profile of the rotatable roll based on the first signals, the second signals, and third signals.

In a further aspect, the invention is directed to a method of monitoring the surface temperature of a rotating roll that includes the steps of:

(a) positioning a temperature gauge assembly adjacent a rotatable roll, which is capable of rotating about its longitudinal axis, that includes:
  (i) an air temperature sensor which is positioned adjacent the surface of the rotating roll such that a gap is established between the air temperature sensor and the surface of the rotatable roll, wherein rotation of the rotating roll causes air to flow through the gap and onto the air temperature sensor, and wherein the air temperature sensor generates first signals that are indicative of the temperature of the air that comes into contact with the air temperature sensor;
  (ii) a compensator sensor that generates second signals that are indicative of ambient temperature; and
  (iii) a standardization sensor that generates third signals that are indicative of the surface temperature of the roll;
(b) calibrating the air temperature sensor, the compensator sensor and the standardizing sensor and constructing calibration curves;
(c) obtaining measurements from the air temperature sensor that generates first signals;
(d) obtaining measurements from the compensator sensor that generates second signals; and
(e) calculating the temperature of the surface of the rotatable roll based on the first signals and the second signals.

DETAILED DESCRIPTION OF PREFERRED EMBODIMENTS

Figure 1A:
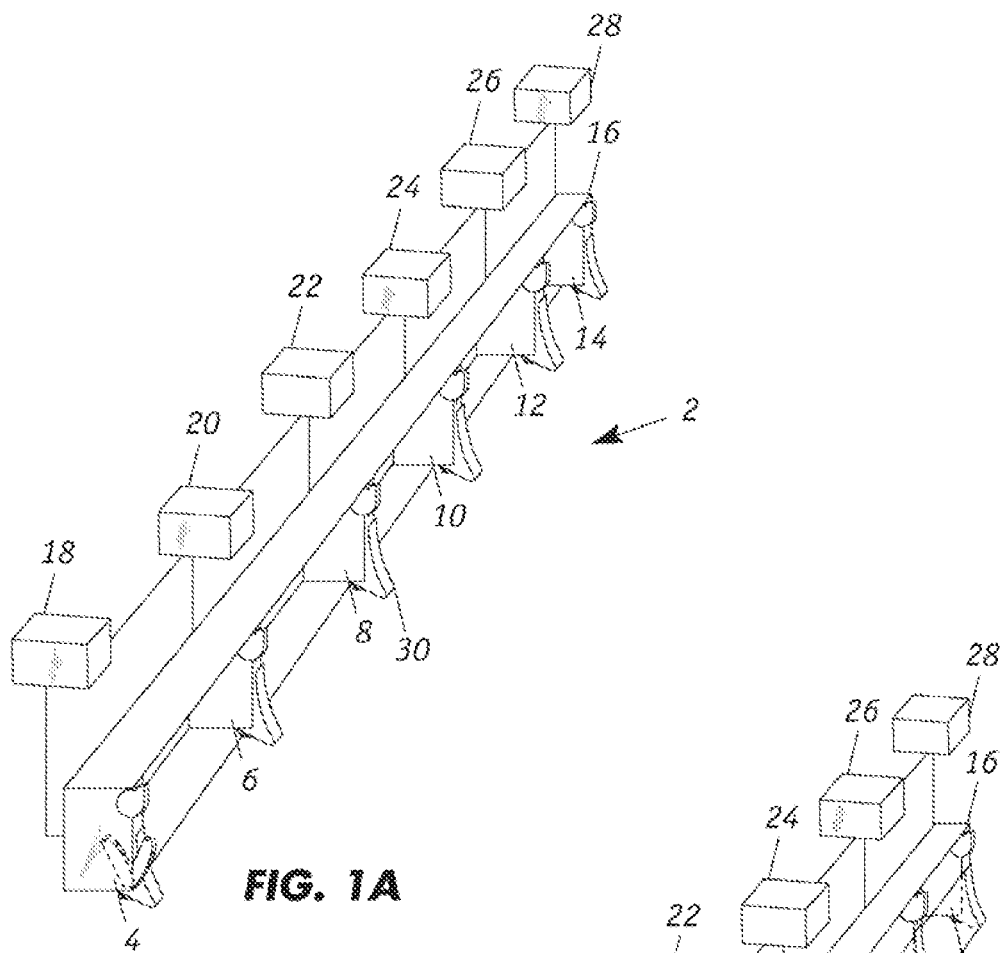
FIGS. 1A and 1B are perspective views of non-contacting temperature measurement profile sensors.

As shown in FIG. 1A, one embodiment of the non-contacting temperature measurement sensor 2 comprises an elongated housing 16 into which sensor modules 4, 6, 8, 10, 12, and 14 are positioned. As further described herein, module 4 that is located at one end of housing 16 supports a reference sensor that includes standardization sensor apparatus for measuring the temperature of a rotating roll along its edge. Each of modules 6, 8, 10, 12 and 14 that are located in the middle portion of housing 16 supports a profile sensor that includes an air temperature sensor and air compensator sensor that measures ambient temperatures. The exterior surface 30 of the reference and profile sensors has a curved contour that matches the exterior surface of the rotatable roll being monitored. These contours are preferably at a fixed distance to the rotatable roll. Operation of module 4 is implemented via controller 18. Air temperature and ambient temperature measurement signals at positions 4, 6, 8, 10, 12 and 14 are transmitted for processing via controllers 18, 20, 22, 24, 26, and 28, respectively. Modules 6, 8, 10, 12 and 14 preferably are stationary and comprise no moving elements. In particular, preferably all the profile (air) temperature and ambient (compensator) temperature sensors are stationary as described herein. For module 4, preferably the only moving elements are the retractable arm 32 and standardization sensor 34 (FIG. 2B) as further described herein.

Figure 1B:
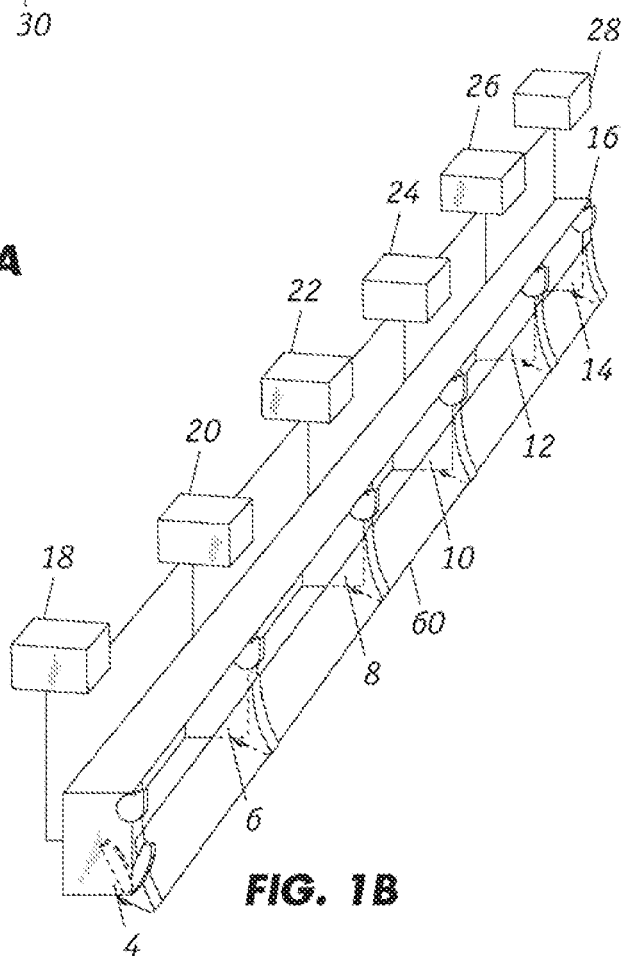

FIG. 1B depicts the embodiment of the non-contacting temperature measurement profile sensor as that shown in FIG. 1A with the addition of front panel 60 which has a curved exterior surface that is flush with the curved contour surface of the reference and profiles sensors. This configuration presents a smooth continuous front surface facing a rotatable roll. The presence of the panel is conducive to creating a uniform airflow pattern along the length of the non-contacting temperature measurement sensor.

Figure 1C:
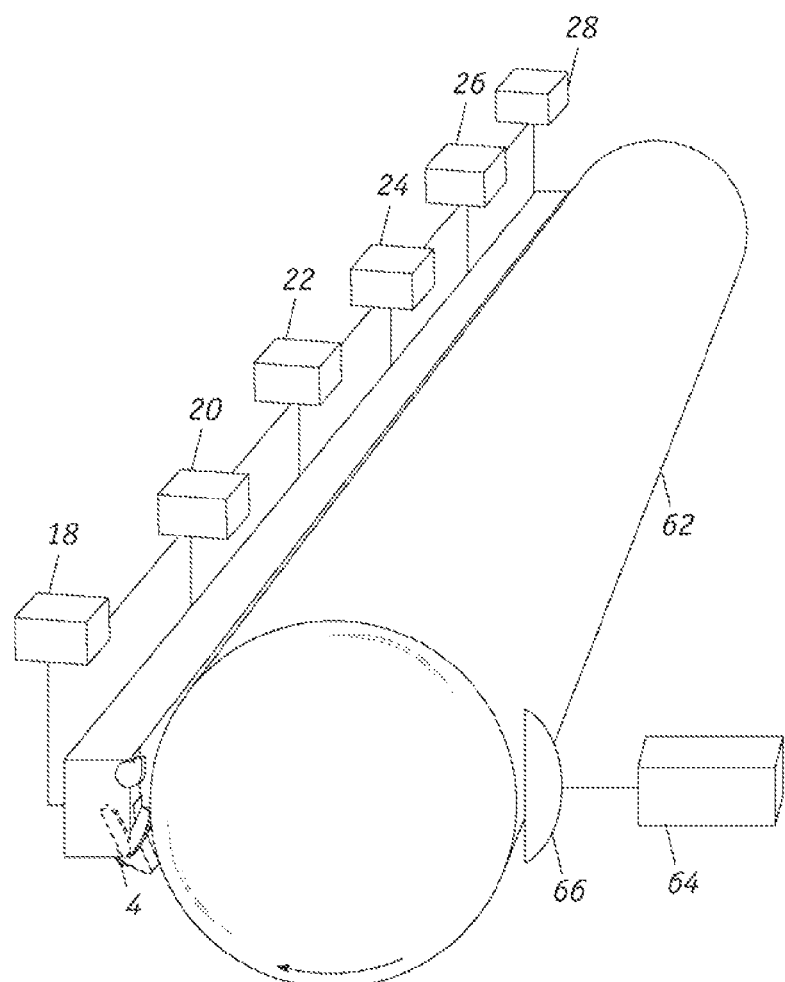
FIG. 1C shows the temperature profile sensor positioned adjacent a rotatable roll.

In operation as shown in FIG. 1C, a rotatable roll 62 to be monitored is positioned adjacent the profile sensor. A calibration sensor 66 with handle 64 that is preferably manually placed in contact with the surface of rotatable roll 62 at the axial position of each of modules 4, 6, 8, 10, 12, and 14 (FIG. 1B) to calibrate the air temperature and compensation sensors in each module. In addition to the air temperature and compensation sensors in module 4, a standardization sensor therein is also calibrated during startup of operations as further described herein. The calibration is preferably any contact probe such as a thermocouple that directly measures the roll surface temperature. The non-contacting temperature measurement sensor is particularly suited for measuring rotating rolls in paper and paperboard process where the heated rolls (which include cylinders) are typically 2 to 12 meters in length and 0.25 to 7 meters in diameter. The rolls are heated by water, magnetic induction, infrared radiation, oil or steam and, in paper processes, the rolls are typically constructed of polished mild steel that can be covered with chrome. Although any number of middle modules 6, 8, 10, 12 and 14 (FIG. 1B) can be employed, preferably sufficient number modules with their attendant air temperature sensor and ambient temperature sensor devices are positioned so as to be from 2 to 20 cm apart. In papermaking operations, the roll can move at rotational speeds of from 100 to 2000 rpm and higher and are heated to temperatures ranging from 20 to 250° C.

Figure 2A:
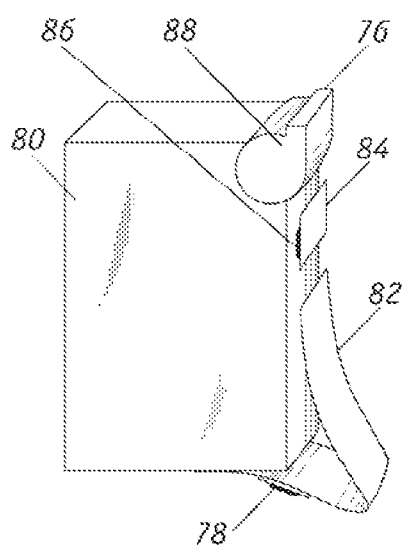
FIG. 2A illustrates a module housing a profile sensor device.

FIG. 2A depicts profile module 80 which serves as a support for a profile sensor assembly that includes chamber 84 that houses a profile air temperature sensor 86 which is preferably open to radiant energy emitted by a rotatable roll. Chamber 84 can be constructed from a conventional venturi device. Spaced apart from chamber 84 is a guide panel 82 that presents a smooth, contour exterior surface. Situated above chamber 84 is air discharge device 88 which can consist of a conventional air blower that is equipped with outlet 76. The lower gap between guide panel 82 and chamber 84 functions as an air passage way or entrance into chamber 84 where and the upper gap between chamber 84 and air discharge device 88 functions as an exit. Finally, the profile sensor assembly includes compensator temperature sensor 78 that is secured a sufficient distance from air temperature sensor 86 and away from the roll surface so as to measure the ambient temperatures during operations. Preferably, profile sensor compensator temperature sensor 78 is positioned on a lower surface of panel 82. The compensation ambient air temperature sensors are preferably shielded from both roll transmitted radiant energy and the air flow that follows the roll surface. The computation of each roll surface temperature reading is based on the difference between the two signals.

Figure 2B:
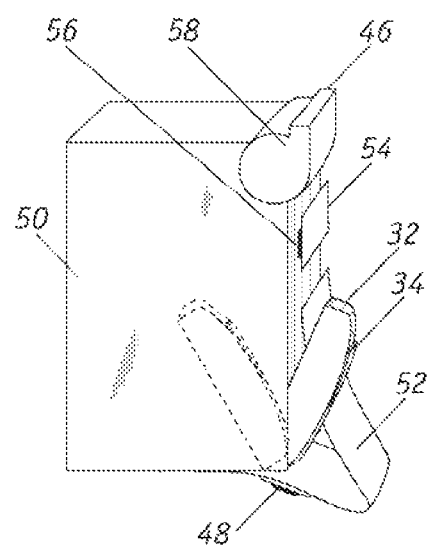
FIG. 2B illustrates a module housing a reference sensor device.

FIG. 2B depicts reference module 50 which is installed at the edgemost temperature measurement point and serves as a compartment for a reference sensor that includes standardization sensor 34 which is secured to retractable arm 32 that can be driven by an air cylinder. Standardization sensor 34 is preferably a contact sensor with an element constructed of materials that is sufficiently durable but which will not damage the rotating roll surface. Suitable contact sensors include, for example, thermocouples. The reference sensor also includes a reference air temperature sensor 56 that is housed in chamber 54, which in turn is spaced apart from guide panel 52. Situated above chamber 54 is air discharge device 58 with outlet 46. A reference compensator temperature sensor 48 is positioned on a lower surface of panel 52. The reference air temperature sensor 56 and reference compensator temperature sensor 48 can have the same structures as those the profile air temperature sensor 86 and profile compensator temperature sensor 78, respectively, and operate in the same way.

The air temperature sensor and compensator sensor of both the reference and profile sensors are non-contacting sensors that can comprise, for example, K-type thermocouples. Each of the standardization sensor, air temperature sensor and compensator temperature sensor preferably has a low thermal mass element that has a time constant of less than 10 seconds. Alternatively, the low mass element can be made of a thin material with known emissivity and signals are generated by an optical temperature sensor that is directed to the thin material.

Figure 3:
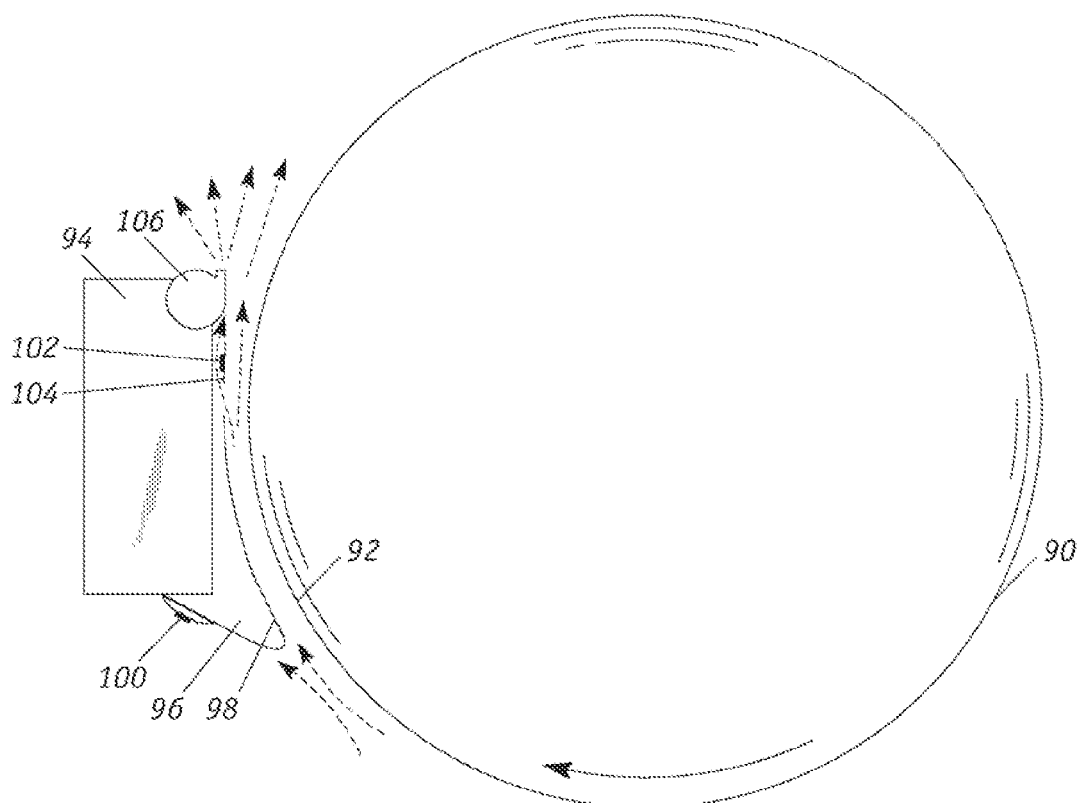
FIG. 3 is a side view illustrating operations of the profile sensor device with air temperature and ambient temperature sensors.

FIG. 3 illustrates the airflow pattern in the vicinity of rotating roll 90 and module 94 and its associated profile sensor assembly. Exterior surface 98 of guide panel 96 is situated preferably from 3 to 5 mm from exterior surface 92 of roll 90. As roll 90 rotates, a boundary layer of air that moves along exterior surface 92 is generated. The temperature of this boundary layer is a function of roll surface 92. Most of the boundary layer of air travels through the gap between guide panel 96 and roll 90. As the air approaches chamber 104, it is accelerated by the suction force that is created by the discharged from blower 106. Turbulent air is continuously diverted through chamber 104 and comes into contact with air temperature sensor 102. At the same time, compensator temperature sensor 100, which preferably is secured on an insulation material on the lower portion of module 94, continuously measures the ambient temperature of the environment away from surface 92.

Figure 4:
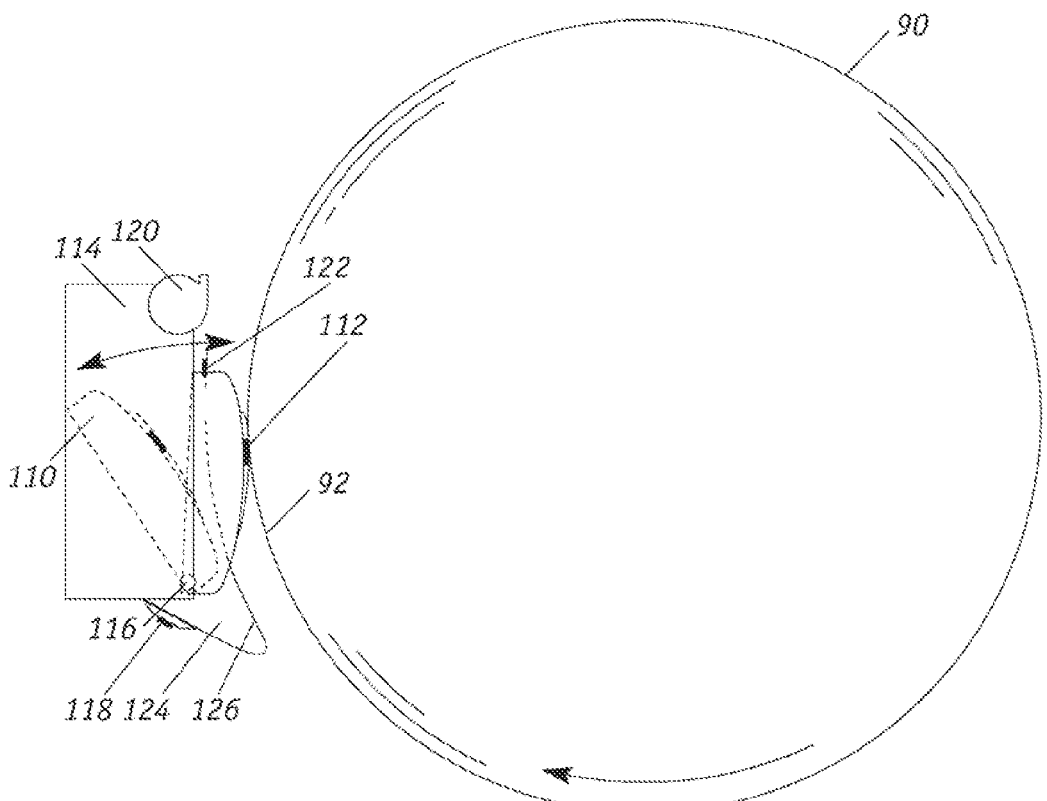
FIG. 4 illustrate operation of the reference sensor.

FIG. 4 illustrates operations of a standardization sensor 112 that is secured to a retractable arm 110 that slides between a stored position within module 114 and an extended position whereby the sensor is touching surface 92 of rotating roll 90. Retractable arm 100 is preferably made of a polymer such as polytetrafluoroethylene (available as TEFLON) and is secured to pivot 116. Standardization sensor 112, which is preferably secured on a resilient insulation material, is employed periodically to contact surface 92 to measure the surface temperature. As shown in FIG. 1C, standardization sensor is preferably positioned at an edge of a rotating roll and aligned with calibration sensor 66. Low pressure contact by standardization sensor 112 will not cause significant erosion of the roll surface at the edge over time since momentary contact is made only for the short amount of time required to acquire a stable reading. As illustrated in FIG. 4, the reference sensor also includes a reference air temperature sensor 122, reference compensator temperature sensor 118, and air blower 120. Surface 126 of guide panel 124 has a contour that matches that of roll surface 92.

Figure 5:
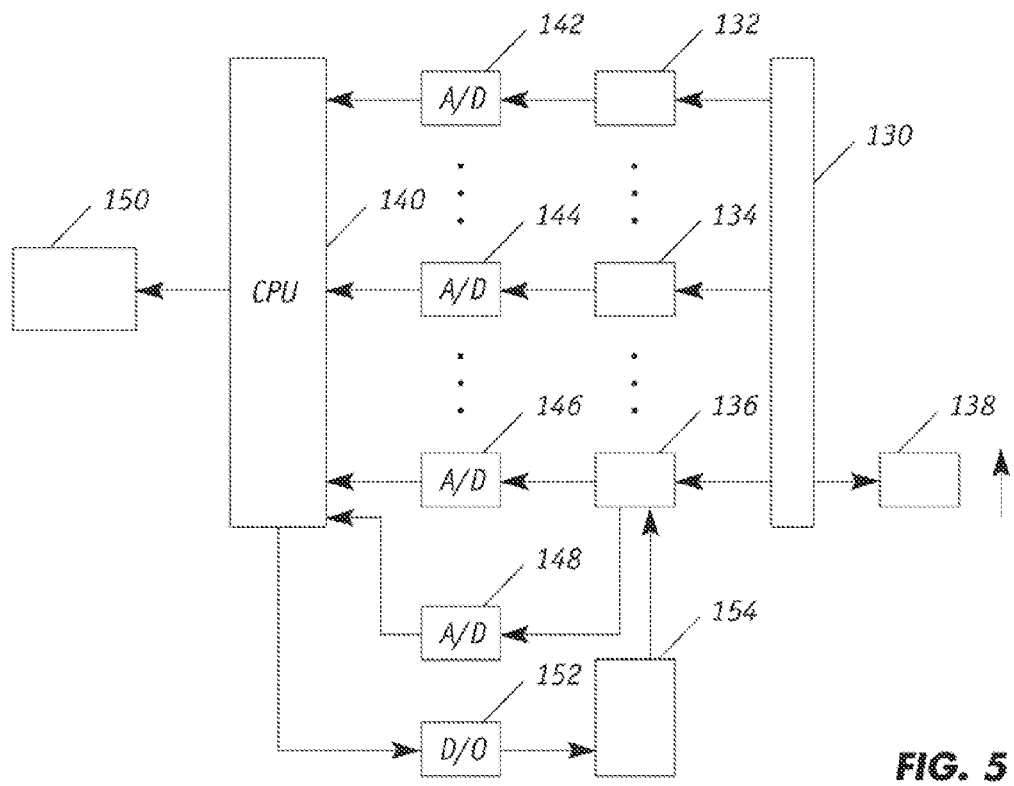
FIG. 5 is a block diagram showing operations of the non-contacting temperature profile sensor and peripheral equipment.

As shown in FIG. 5, the non-contacting temperature profile sensor system comprises a temperature gauge assembly that includes a reference sensor 136 and at least one and preferably a plurality of profile sensors 132, 134. Reference sensor 136 includes a reference air temperature sensor, reference compensator temperature sensor, and standardization sensor. Each profile sensor includes an air temperature sensor and a reference compensator temperature sensor. This array of sensors 132, 134, and 136 is positioned adjacent rotating roll 130. A/D converters 142, 144, and 146 digitize signals from the various sensors as shown. A/D converter 148 digitizes signals from the standardization sensor in reference sensor 136. Processing unit 140 controls actuators 150, which for example can regulate the heating of roll 130. Digital output (D/O) signal 152 from processing unit 140 activates an air cylinder 154 that drives the retractable arm 32 of the standardization sensor 34 (FIG. 2B). Calibration sensor 138 is used during startup and periodically during production to calibrate the standardization, the air temperature, and the compensator temperature sensors of reference sensor 136. Calibration sensor 138 is also utilized at startup and periodically during production to calibrate the plurality of profile sensors 132, 134. Specifically, initial calibration is performed using contact probe of calibration sensor 138. The indicated temperatures from the standardization, air temperature and compensator sensors of reference sensor 136 are compared with the readings from calibration sensor 138. The differences are then employed to generate a calibration curve for reference sensor 136. Further, the indicated temperatures from the air temperature and compensator sensors of each of profile sensors 132, 134 are compared with the readings from calibration sensor 138 to produce calibration curves for each of profile sensors 132, 134. The differences between the calibration curves of each profile sensors 132, 134 and the calibration curves of reference sensor 136 are used to produce a correction curve for each of profile sensors 132, 134. These correction curves represent the difference between the readings at reference sensor 136 and the readings at each of profile sensors 132, 134 and will be applied to the production data during operations.

In the standardization sequence, the standardization sensor of reference sensor 136 is held in contact with the roll surface. The readings from the air temperature and the compensator temperature sensors of reference sensor 136 are compared with the readings from the standardization sensor of reference sensor 136 and the differences are used to generate a calibration curve. This calibration curve, along with the correction curves produced from measurements with calibration sensor 138 at the positions of each of profile sensors 132, 134 during initial startup, is then applied to the raw data from profile sensors 132, 134 to produce the calculated roll surface temperature at the locations of each of profile sensors 132, 134. The calibration curve constants are recalculated each time the standardization sequence commences.

Rapid and accurate temperature determination of the roll surface by ab initio calculations given the gas boundary layer temperature is difficult since convective and radiative heat transfer have to be considered and ill-characterized variables, including ambient air density, composition, local air velocity and accurate local heat transfer properties, are involved. The empirical method described above effectively maintains the accuracy of calculated roll surface temperature readings, at each location corresponding to the plurality of profiles sensors, to within an acceptable tolerance.

Figure 6:
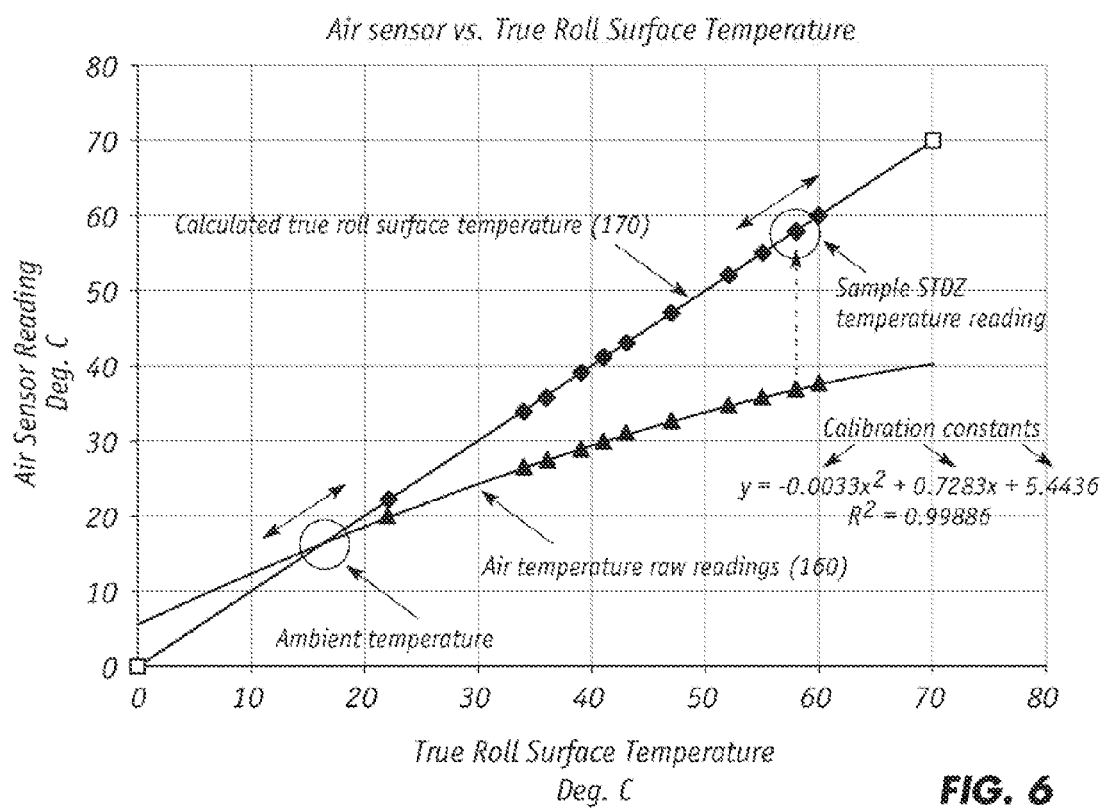
FIG. 6 depicts a representative of calibration curve.

The method is illustrated in FIG. 6. The calculated true roll surface temperature (170) is the line produced by the air temperature sensor measurements after suitable compensation of the air temperature raw readings (160). The compensation is performed for reference sensor 136 by applying the calibration curve obtained at the previous standardization time. The compensation is performed for the plurality of profile sensors 132, 134 by applying the calibration curve obtained at the previous standardization time and further applying the correction curve for the individual profile sensor generated at the previous calibration sequence with calibration sensor 138. The intersection of the raw air temperature raw curve (160) with 170 is at the ambient temperature, the condition where at that particular measurement point is exactly the same as the roll surface temperature. In practice, the ambient temperature is measured by the compensator temperature sensor. Once the ambient temperature is determined, the air temperature raw reading curve (160) is shifted along the direction of the air sensor reading axis until the intersection of curve 170 and curve 160 is at the ambient temperature as read on the true roll surface temperature axis. The air temperature sensor reading is then converted to a true roll surface temperature by reading the corresponding temperature on the true roll surface temperature axis. Although the above description of the method is for a graphical data conversion procedure, the procedure can be performed numerically when operating curves are reduced to suitable equations. Preferably, the calculations are performed numerically with a computer in order to achieve the short response time required for a rapidly changing dynamic system with multiple sensor inputs.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A device for measuring the temperature of an exterior surface of a rotating roll that is rotatable about a longitudinal axis that comprises:
    an air temperature sensor, which is housed in a chamber having an entrance and an exit, and which is configured to be positioned adjacent the surface of the rotating roll such that a gap is established between the air temperature sensor and the surface of the rotating roll;
    a guide panel having an exterior surface with a curved contour that matches the exterior surface of the rotating roll and positioned downstream of the entrance of the chamber wherein rotation of the rotating roll causes air to flow through the gap and diverts turbulent air into the entrance of the chamber and onto the air temperature sensor, and wherein the air temperature sensor generates first signals that are indicative of the temperature of the air that comes into contact with the air temperature sensor;
    a compensator temperature sensor that generates second signals that are indicative of ambient temperature;
    a standardizing sensor that generates third signals that are indicative of the surface temperature of the roll; and
    means for calculating the temperature of the surface of the rotating roll based on the first signals, second signals, and third signals.

2. The device of claim 1 further comprising an air discharge device that removes air from the exit of the chamber.

3. The device of claim 1 wherein the compensator temperature sensor is shielded from radiant energy transmitted from the rotating roll and from the air flow in the gap.

4. The device of claim 1 wherein the chamber comprises a venturi device.

5. The device of claim 1 wherein the means for calculating the temperature receives the first signals, the second signals, and the third signals and extracts the surface temperature from calibration curves.

6. The device of claim 1 wherein the rotatable roll surface is fabricated of a solid material.

7. The device of claim 1 wherein the rotatable roll moves at a rotational speed that ranges from 100 to 2000 rpm.

8. The device of claim 1 wherein the rotatable roll has a cylindrical across section with a diameter that ranges from 0.25 to 7.0 meters.

9. The device of claim 1 wherein the air temperature sensor is positioned a distance that ranges from 3 to 5 mm from the surface of the rotating roll.

10. The device of claim 1 wherein the roll temperature calibration sensor is in contact with an edge of the rotating roll when generating the third signals.

11. The device of claim 1 wherein the air temperature sensor comprises an element that has a time constant of less than 10 seconds.

12. An apparatus for detecting the exterior surface temperature profile of an elongated rotating roll rotating about a longitudinal axis that comprises:
    (a) a reference sensor configured to be positioned adjacent a first location along the length of the roll which comprises:
        (i) a reference air temperature sensor configured such that a gap is established between the reference air temperature sensor and the surface of the rotating roll, wherein rotation of the rotating roll causes air to flow through the gap and onto the reference air temperature sensor, and wherein the reference air temperature sensor generates first signals that are indicative of the temperature of the air that comes into contact with the reference air temperature sensor;
        (ii) a reference compensator temperature sensor that generates second signals that are indicative of ambient temperature; and
        (iii) a standardizing sensor that generates third signals that are indicative of the surface temperature of the roll;
    (b) a plurality of profile sensors which are each configured to be positioned at a location along the length of the roll with each profile sensor comprising:
        (i) a profile air temperature sensor, which is housed in a chamber having an entrance and an exit, and which is configured such that a gap is established between each profile air temperature sensor and the surface of the rotatable roll;
        (ii) a guide panel having an exterior surface with a curved contour that matches the exterior surface of the rotating roll and positioned downstream of the entrance of the chamber wherein rotation of the rotatable roll causes air to flow through each gap and diverts turbulent air into the entrance of the chamber and onto the profile air temperature sensor, and wherein each profile air temperature sensor generates first signals that are indicative of the air flow that comes into contact with the profile air temperature sensor; and
(iii) a profile compensator sensor that generates second signals that are indicative of ambient temperature; and
(c) means for calculating the surface temperature profile of the rotatable roll based on the first signals, the second signals, and third signals.

13. The apparatus of claim 12 wherein each profile sensor further comprising an air discharge device that removes air from the exit of the chamber.

14. The apparatus of claim 12 wherein the means for calculating the temperature receives the first signals, the second signals, and third signals and extracts the surface temperature from calibration curves.

15. The apparatus of claim 12 wherein the reference sensor is configured so that the standardization sensor is positioned along an edge of the elongated rotatable roll.

16. The apparatus of claim 12 wherein the surface temperature of the rotatable roll ranges from 20 to 250° C.

17. The apparatus of claim 12 wherein the plurality of profile sensors are spaced a distance of approximately 2 to 20 cm apart.

18. A method of monitoring the surface temperature profile of a rotating roll along it length that comprises the steps of:
(a) positioning a plurality of temperature gauge assemblies adjacent to and along the length of a rotatable roll, which is capable of rotating about its longitudinal axis and forming a boundary layer of air along a contour of the rotating roll, wherein each temperature gauge assembly comprises:
(i) an air temperature sensor, which is housed in a chamber having an entrance and an exit, and which is positioned adjacent the surface of the rotating roll such that a gap is established between the air temperature sensor and the surface of the rotatable roll;
(ii) guide panel having an exterior surface with a curved contour that matches the exterior surface of the rotating roll and positioned downstream of the entrance of the chamber wherein rotation of the rotating roll causes air to flow through the gap and diverts turbulent air into the entrance and onto the air temperature sensor, and wherein the air temperature sensor generates first signals that are indicative of the temperature of the air that comes into contact with the air temperature sensor;
(iii) a compensator sensor that generates second signals that are indicative of ambient temperature wherein the compensator sensor is shielded from radiant energy transmitted from the rotating roll and from the air flow; and
(iv) a standardization sensor that generates third signals that are indicative of the surface temperature of the roll;
(b) calibrating the air temperature sensor, the compensator sensor and the standardizing sensor and constructing calibration curves;
(c) obtaining measurements from the air temperature sensor that generates first signals;
(d) obtaining measurements from the compensator sensor that generates second signals; and
(e) calculating the temperature of the surface of the rotatable roll based on the first signals and the second signals.

19. The method of claim 18 wherein step (d) comprises periodically contacting the surface of the rotatable roll with the standardizing sensor.

20. The method of claim 18 wherein step (b) comprises heating or cooling the surface of the rotatable roll to specific temperatures and calibrating the air temperature sensor, compensator sensor, and the standardizing sensor.

21. The device of claim 1 wherein the chamber is positioned between the air temperature sensor and the rotating roll.

22. The apparatus of claim 12 wherein the chamber is positioned between the profile air temperature sensor and the rotating roll.

23. The method of claim 18 wherein the chamber is positioned between the air temperature sensor and the rotating roll and the method includes the step of creating a suction force to accelerate air flow through the entrance of each chamber.

* * * * *